(12) United States Patent
Ulmert

(10) Patent No.: US 10,829,397 B2
(45) Date of Patent: Nov. 10, 2020

(54) METHOD TO OPTIMISE THE CHEMICAL PRECIPITATIONS PROCESS IN A WATER- OR WASTE WATER TREATMENT PLANTS

(71) Applicant: Hans Ulmert med firma FloCell, Lund (SE)

(72) Inventor: Hans Ulmert, Lund (SE)

(73) Assignee: Hans Ulmert med firma FloCell, Lund (SE)

( * ) Notice: Subject to any disclaimer, the term of this patent is extended or adjusted under 35 U.S.C. 154(b) by 193 days.

(21) Appl. No.: 14/771,291

(22) PCT Filed: Feb. 28, 2014

(86) PCT No.: PCT/SE2014/050248
§ 371 (c)(1),
(2) Date: Aug. 28, 2015

(87) PCT Pub. No.: WO2014/133448
PCT Pub. Date: Sep. 4, 2014

(65) Prior Publication Data
US 2016/0009576 A1    Jan. 14, 2016

(30) Foreign Application Priority Data
Feb. 28, 2013    (SE) ........................ 1300156

(51) Int. Cl.
*C02F 1/52*        (2006.01)
*C02F 1/66*        (2006.01)
*C02F 103/28*      (2006.01)

(52) U.S. Cl.
CPC .............. *C02F 1/5245* (2013.01); *C02F 1/66* (2013.01); *C02F 2103/28* (2013.01);
(Continued)

(58) Field of Classification Search
CPC ..................................................... C02F 1/5245
See application file for complete search history.

(56) References Cited

U.S. PATENT DOCUMENTS

| | | | | |
|---|---|---|---|---|
| 5,354,458 A | * | 10/1994 | Wang ..................... | B01D 53/46 210/180 |
| 2002/0121484 A1 | * | 9/2002 | Arai .................... | B01D 21/0012 210/723 |

(Continued)

FOREIGN PATENT DOCUMENTS

| | | |
|---|---|---|
| JP | 2004-141782 A | 5/2004 |
| WO | 2004/005192 A1 | 1/2004 |
| WO | 2010/105303 A1 | 9/2010 |

OTHER PUBLICATIONS

Yan et al., "Enhanced coagulation with polyaluminum chlorides: Role of pH/Alkalinity and speciation", Chemosphere 71, 2008, pp. 1665-1673.
(Continued)

*Primary Examiner* — Peter Keyworth
(74) *Attorney, Agent, or Firm* — Renner, Otto, Boisselle & Sklar, LLP

(57) ABSTRACT

The invention relates to a method to purify water and reduce the operation costs by regulating the basicity of the aluminium based coagulants in situ as one of the parameters, such as purification of water in water—or waste water treatment plants.

9 Claims, 2 Drawing Sheets

(52) U.S. Cl.
CPC .. *C02F 2209/001* (2013.01); *C02F 2209/003* (2013.01); *C02F 2209/02* (2013.01); *C02F 2209/08* (2013.01); *C02F 2209/11* (2013.01); *C02F 2209/40* (2013.01)

(56) References Cited

U.S. PATENT DOCUMENTS

| | | | | |
|---|---|---|---|---|
| 2008/0288111 | A1* | 11/2008 | Yamaguchi | C02F 1/5209 700/271 |
| 2009/0107913 | A1* | 4/2009 | Johnson | C05F 5/008 210/604 |
| 2012/0285895 | A1* | 11/2012 | Smiddy | C02F 1/56 210/724 |

OTHER PUBLICATIONS

International Search Report for corresponding International Application No. PCT/SE2014/050248 dated May 30, 2014.
Extended European Search Report for corresponding European Application No. 14757292.9 dated Aug. 3, 2016.
Yan et al., "Natural organic matter (NOM) removal in a typical North-China water plant by enhanced coagulation: Targets and techniques", Separation and Purification Technology, vol. 68, No. 3, Aug. 25, 2009, pp. 320-327.
Kimura et al., "Minimizing residual aluminum concentration in treated water by tailoring properties of polyaluminum coagulants", Water Research, vol. 47, No. 6, Jan. 31, 2013, pp. 2075-2084.

* cited by examiner

METHOD TO OPTIMISE THE CHEMICAL PRECIPITATIONS PROCESS IN A WATER- OR WASTE WATER TREATMENT PLANTS

This application is a national phase of International Application No. PCT/SE2014/050248 filed Feb. 28, 2014 and published in the English language, which claims priority to Application No. SE 1300156-5 filed Feb. 28, 2013.

FIELD OF INVENTION

The invention relates to a method to purify water and reduce the operation costs by regulating the basicity of the aluminium based coagulants in situ as one of the parameters, such as purification of water in water- or waste water treatment plants.

BACKGROUND OF INVENTION

Aluminium salts (coagulants), such as aluminium sulphate or aluminium chloride are used to chemically precipitates raw water as well as waste water. The salts tri-valent aluminium ion becomes hydrolysed in the water and forms a poorly soluble aluminium hydroxide precipitate as shown below:

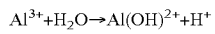

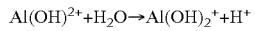

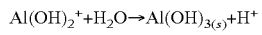

Since the reaction demands that the hydroxide ions are present in the water it is sometimes necessary to add hydroxide ions by, for example dosage of sodium or calcium hydroxide to reach the optimal precipitation pH of 5,5-6,5. Upon hydroxide precipitation coagulants are formed in the water which adsorb and enclose soluble and insoluble organic substances as well as particles in the water. The formed precipitate (sludge) can be separated from the purified water by for example filtration, sedimentation or flotation. Due to among other things economical reasons you do not want to add more coagulant than needed to gain an acceptable quality on the purified water without spending too much money. One non insignificant factor is that the sludge amount increases with an increased addition of the coagulant as well as the handlings costs and the costs to get rid of the material. In some cases up to about 40% of the formed amount of dry substance may comprise precipitated aluminium hydroxide. An optimisation of the precipitation process is thus of importance both for environmental purposes as well as economical purposes. In the chemical precipitation the amount of soluble organic substances are reduced in the water, which often influences the colour of the purified water. This means for example that a reduction of the humus substance in the raw water and the rests of lignin in the waste water from pulp-mills result in a reduction of the colour of the water. The turbidity of the water is also reduced by chemical precipitation. The turbidity is caused by particles in the water which may comprises inorganic substances, such as clay, as well as other organic compounds, such as remaining bacterial colonies after biological purification, emulsified oil or fibres. Together they constitute the amount of suspended solids (SS-Suspended Solids). At the same time the organic part together with the soluble organic substance form the total amount of oxygen consuming substances in the water. The total amount of organic carbon is analysed as TOC (Total Organic Carbon) and the oxygen consuming substances as COD (Chemical Oxygen Demand). The analyses could be performed either continuously and/or automatically, i.e., using on-line sensors.

In a water solution containing monomeric aluminium complexes with hydroxide bridges can be created. With an increased basicity these complexes obtain an increased charge according to the table below:

|  | OH/Al | Basicity |
|---|---|---|
| $Al^{3+}$ | 0.0 | 0% |
| $Al_2(OH)_2^{4+}$ | 1.0 | 33% |
| $Al_{13}O_4(OH)_{24}^{7+}$ | 2.5 | 82% |
| $Al(OH)_{3(s)}$ | 3.0 | 100% |

The complex $Al_2(OH)_2^{4+}$ has a chain form and the complexes $Al_{13}O_4(OH)_{24}^{7+}$ have a spherical form. The one mentioned last can be polymerised into chains of spheres with the following formula $[Al_{13}O_4(OH)_{24}^{7+}]_n$.

Monomeric aluminium sulphate and aluminium chloride are produced by dissolving an aluminium comprising material, such as aluminium hydroxide, in an acid, i.e., $H_2SO_4$ respectively HCl in stoichiometric amounts. An increased basicity can be obtained by using a deficiency of acid during the dissolution, which demands that the reaction occurs at an increased pressure as well as an increased temperature. An increased basicity can also be obtained by adding hydroxide ions to a monomeric aluminium sulphate or chloride solution. Aluminium sulphate, with an increased basicity are often called PAS (Poly Aluminium Sulphate) and the chloride as PAC (Poly Aluminium Chloride). Monomeric aluminium sulphate are normally provided in a granulated form with an Al-amount of about 8% and the monomeric aluminium chloride as a solution with the same amount of Al. Aluminium sulphate can also be obtained in a solution but the amount Al is then about 4%. Polymerised products are often offered as a solution with an amount of about 4% Al for PAS and about 8% for PAC. The costs for transportation in relation to the Al content are therefore lower for PAC compared to PAS. If there is no need for a polymerised product, the most cost effective alternative is normally aluminium sulphate in a granulated form, especially if the consumption is high.

The use of polymerised coagulants (especially PAC) has increased their market shares, mainly depending on that aluminium complexes with an increased basicity have been found to reduce the turbidity in water better compared to monomeric coagulants. Particles (including colloids) in water if often negatively charged and a neutralisation of the charge and coagulation is favoured by a high charge of the coagulant.

Coagulation occurs also faster and the hydroxide coagulate becomes larger, which often favours the coagulant separation process, especially at low water temperature. On water with high turbidity it is possible to reach a lower turbidity by using a poly aluminium coagulant, compared to the same or a higher dose of another monomeric (Al—) coagulant. The degree of basicity is of importance, since a to high basicity can result in that aluminium hydroxide precipitates, before the coagulant has been distributed in the complete water volume which should be precipitated, i.e., it becomes too reactive. Another disadvantage with a high basicity is that the precipitation of soluble organic compounds in many cases becomes worse. If you are treating water having a content which changes over time, the basicity of the coagulant may be optimised after the pending conditions. One example being a raw water from a river which upon heavy rain can contain a large amount of particles (high turbidity), and during dry periods comprises a lower amount of particles (low turbidity) but a higher amount of organic substances. Another example is waste water from the pulp and paper mills. There the amount of soluble organic compounds in the waste water is dependent on the raw wood material that is used at the moment. Except controlling the dosage of the coagulant proportional against the treated amount of water it is also common that the dose is changed due to the turbidity on the discharged treated water and/or the incoming water. In the same way the colour of the water or the content of COD/TOC can be used to control the dosage.

Production of PAC and PAS demands a relatively large investment in the process equipment, due to that these processes if they are based on a deficiency of acid will give rise to an increased pressure and temperature. It is also possible to increase the basicity by addition of hydroxide ions to a monomeric Al-solution. The hydroxide ions may be added as a solution or suspension. The solution or suspension dilutes the final product, i.e., the Al content is reduced and the transportations costs are increased. Something that is of no importance if the process is performed in situ. If you as a producer have invested in an expensive process equipment it will become more economical to use a lower acid consumption compared to adding hydroxide. Since the production is centralised the basicity is adapted depending on the users general demands. Due to technical production and logistical reasons it is not possible for a producer to adapt the basicity after the individual and immediate consumers demands. This means that the consumer solely can influence the result of the precipitation by changing the dosage of the coagulant to meet variations in the degree of impurities.

Mingquan et al., chemosphere 71 (2008)1665-1673d, discloses a study wherein a number of parameters have been studied in connection with coagulation within the area of water treatment. The conclusion was that basicity, speciation and the dosage of the coagulant should be optimised based on raw water alkalinity to enhance the removal of natural organic matter (NOM).

WO2004/005192 discloses a metal sulphate composition and a method how to produce such a composition. The composition could be used in the purification of water.

One object of the invention is thus to provide a method that give rise to an increased purification of the water from for example water- or waste water treatment plants. This is achieved by regulating the basicity of the aluminium based coagulant in situ after precipitation conditions, which result in an improved degree of purity and less influence on the environment. This will as well be more economical and reduce the operation costs in the plants which often area critical parameter. By the use of an in situ method it is for the first time possible to control the purification system in relation to the basicity in an optimised manner which result in that lesser amounts of the coagulant is consumed which will reduce the pressure on the environment as well as reduce the operation costs and sludge production. Thus, an environmental friendly method is provided.

SUMMARY OF THE INVENTION

The invention relates to an in situ method, which regulates the basicity of an aluminium based coagulant and optimises the chemical precipitation process in raw water- or waste water treatment plants. The method may be designed in a way that the basicity is regulated by the addition of hydroxide ions, which are added to a solution of the coagulant. The regulation of the basicity occurs in situ and is designed so that the regulation occurs on data obtained from measurements on the degree of contamination of the water. This may be performed either continuously and/or automatically on the in- and out-coming water, i.e., using on-line sensors In a first aspect the invention relates to a method to optimise the chemical precipitation process in a water treatment plant or in a or waste water treatment plant by regulating the basicity of an aluminium based coagulant characterised in that the basicity is regulated by the addition of hydroxide ions, wherein the hydroxide ions are added through a solution of a coagulant and the regulation occurs in situ and the regulation is based upon stored data obtained from on-line measurements of the contamination degree of the water and/or the regulation is based from on-line measurements of the contamination degree of incoming untreated and/or outgoing treated water.

Further advantages and objects with the present invention will be described in more detail, inter alia with reference to the accompanying drawings.

DETAILED DESCRIPTION OF THE INVENTION

Figure 1:
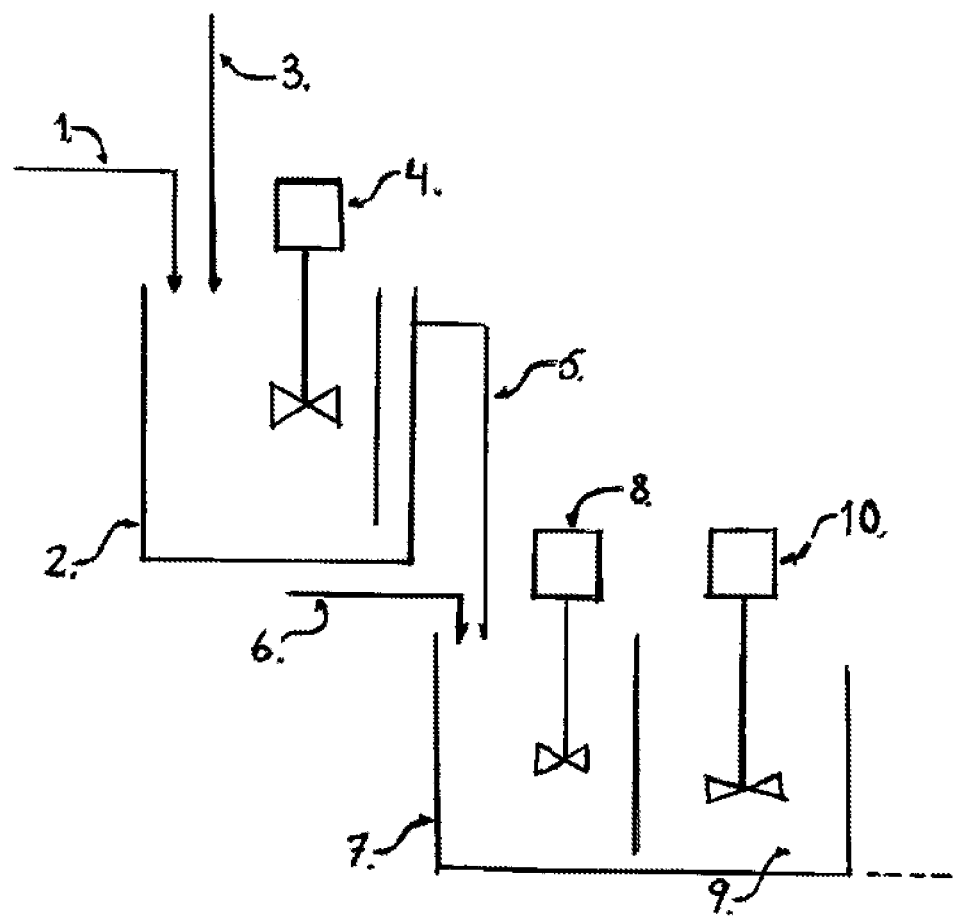
FIG. 1 shows a general flow scheme of the in situ method.
Figure 2:
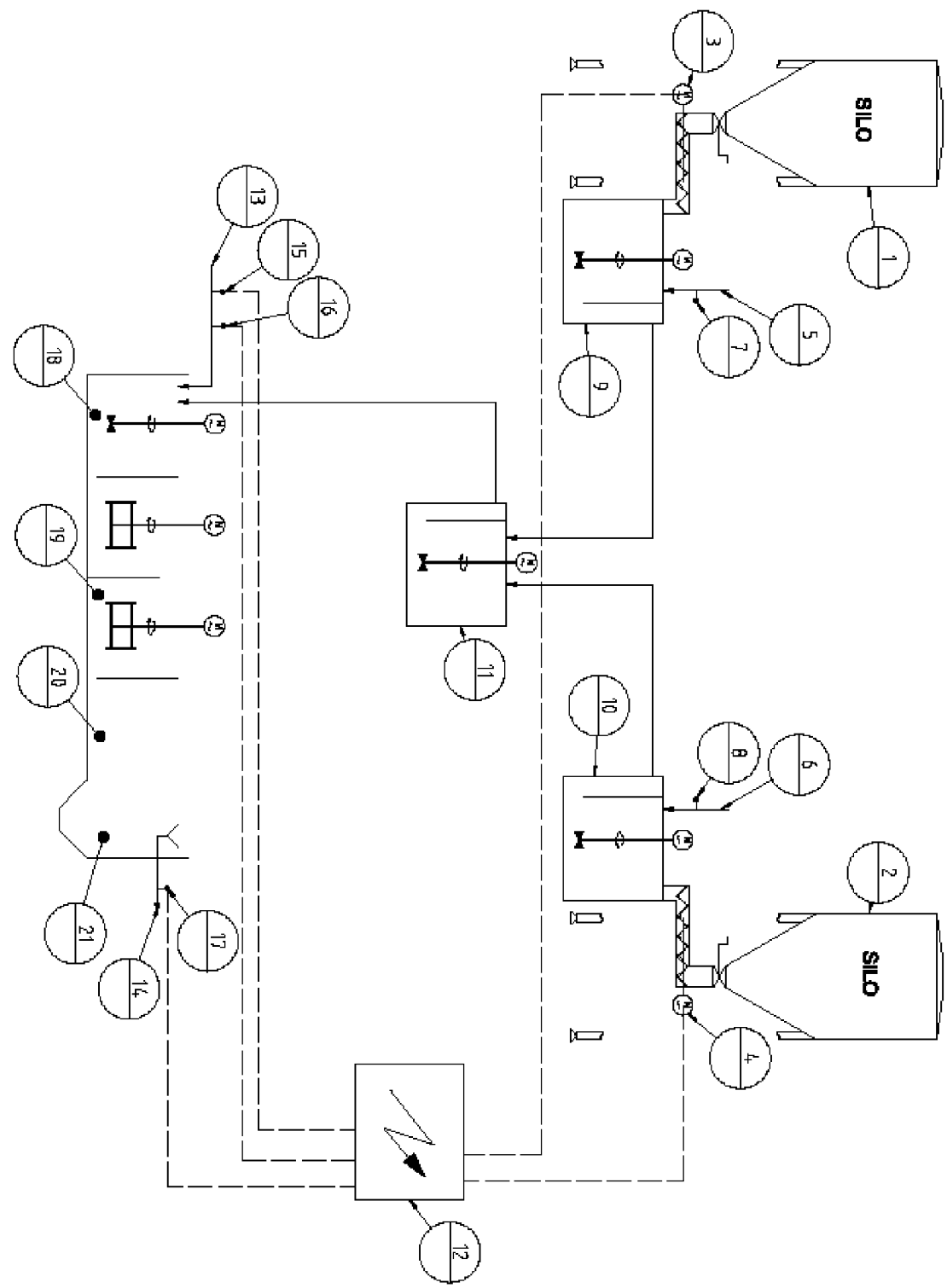
FIG. 2 shows the purification method installed in a treatment plant.

In the context of the present application and invention, the following definitions apply:

The term "basicity" is defined as the numbers of OH in relation to Al as defined below in the table:

|  | OH/Al | Basicity |
| --- | --- | --- |
| $Al^{3+}$ | 0.0 | 0% |
| $Al_2(OH)_2^{4+}$ | 1.0 | 33% |
| $Al_{13}O_4(OH)_{24}^{7+}$ | 2.5 | 82% |
| $Al(OH)_{3(s)}$ | 3.0 | 100% |

The description refers to figure number 1. According to the invention the equipment to be used is preferably equipment already existing in the plant, for the dosages of coagulant solution (1), i.e., the dosage which earlier have been added directly to the water or the waste water which shall be chemically precipitated. The coagulant solution (1) comprising an aluminium salt, such as monomeric aluminium sulphate or aluminium chloride, alternatively a PAS (Poly Aluminium Sulphate) or a PAC (Poly Aluminium Chloride) solution with a low basicity. The chemical properties of the different aluminium salts have been described above. The solution is transferred to a reaction tank (2). A solution or a suspension comprising OH-ions (3) is added to the reaction tank. The solution/suspension comprise for example sodium-, calcium- or magnesium hydroxide. The most efficient hydroxide source being magnesium hydroxide. To increase the basicity on a monomeric aluminium product by the addition of hydroxide ions as sodium- or calcium hydroxide may be difficult, due to that these are rather reactive and precipitation of $Al(OH)_3$ easily occurs. Magnesium hydroxide ($K_{sp}$ $1.5 \times 10^{-11}$) is less reactive and is thus much easier to use as the hydroxide source. A suspension of magnesium hydroxide may be used in the invention, alternatively magnesium oxide which upon being mixed with water is hydrolysed to magnesium hydroxide.

The added amount of OH-ions is controlled such that it corresponds to the desired basicity of the hydroxide complexes that are formed when the solution (1) and suspension (3) are mixed and allowed to react with each other. The mixing of the solution (1) and the suspension (3) occurs by the aid of an extensive mixer (4), placed within the reaction tank. The final solution (5) comprising polymeric aluminium complexes are transferred to the treatment plant where the final solution is mixed with the water (6), which needs to be purified by chemical precipitation. This, occurs as before in a mixing tank (7) provided with an intensive mixer (8). In the mixing tank micro flocks are formed, which in the followed flocculation tank (s)(9) creates larger flocks. The flocculation tank(s) are normally provided with a slow moving flocculation mixer (10).

With the existing technique the user chooses the coagulant which over time gives rise to the best purification result as well as the lowest running costs in relation to the dosage of the coagulant (g Al/m$^3$). For those reasons you choose either a coagulant that is a monomer or has a certain basicity. The dosage of the coagulant is adjusted either manually or automatically, depending on the purification result. To get a fast and simple indication on the purification result it is possible to continuously measure colour and/or turbidity in the water after the flocks have been separated. (supernatant). The purification result can also be measured by analysing COD, TOC, colour, turbidity, Al as well as phosphate. These measuring results may also be complemented with measurements on the incoming water, which could give an early indication on if the coagulant dosage should be changed. Thus the only parameter that could be varied to influence the purification result is the dosage of the coagulant.

The invention utilises at least a second parameter to control the basicity of the coagulant, which is the addition of hydroxide ions in situ in a controlled way. Thus an optimal purification of the water occurs as well as the costs are kept as low as possible.

An advantage of the invention is further that the basicity do not influence the production of sludge, which the coagulant does. An increase amount of aluminium hydroxide in the sludge makes it also more difficult to dewater which contribute to that the cost for the disposal of the waste increases.

Both the incoming untreated as well as the outgoing water may be analysed, such as on-line to be able to control as well as measure the purification efficacy and thereby control the purification. The data may be stored from the analysis and used to regulate the purification process in the future.

The temperature of the water may the purification of the water, which may occur in connection with for example purification of raw water within temperate zones. Regulation of the precipitation process such that the basicity increases at a decreasing water temperature may be an advantage even though the change of the temperature occurs slowly.

The regulation of the invented method disclosed in the application i dependent on the temperature and should normally be kept in between about 5.5 to about 6.5.

The costs to handle (dewatering) and the costs for disposal of the sludge have earlier not been the primary factor upon calculating the operation costs, since it has been regulated by the necessity to adapt the dose of the coagulant to the demands on how pure the water should be. This could now with the new invention be minimised. The purity demands on treated water as well as the percentage of the contaminant and type of the contaminant in the impure water give rise to different demands on the chemical precipitation. These variations may be difficult to meet solely by adjusting the dosage of the coagulant and may result in that the coagulant is overdosed or a worse purification result obtained. Thus the control of the basicity is of importance and to have the control in situ so that it is possible to regulate the basicity in a highly controlled manner.

A computer program, where the user actual costs for hydroxide, coagulant and disposal of the sludge are introduced will give an answer where the breaking point is present, between respectively an increased and decreased basicity versus respectively an increased and decreased dosage of the coagulant. To meet the purification demands is more important than the operation costs. In addition, such a computer program may handle data from measurements of the contaminants and the water temperature and thus regulate the basicity as well as the dosage of the coagulant such that an optimal purification result is obtained. Since different water often has specific qualities and the demands on the treated water is different between different countries the experienced values in connection with these qualities and the purification demands that are set must be included in the computer program to be able to use the information to control the regulation of the purification of the water.

The invention gives an unpredicted possibility to optimise the operation at chemical precipitation and decrease the environmental load as well as reduce the operation costs.

Following examples are intended to illustrate, but not to limit, the invention in any manner, shape, or form, either explicitly or implicitly.

EXAMPLES

Example 1

Chemical Precipitation of Waste Water from a Pulp and Paper Mill

The mill produces about 400,000 tons pulp each year.
The flow of the waste water being about 3,000 m$^3$/h.
The limit of the outlet being 100 mg COD/l and 25 mg SS/l Purification: pre-sedimentation, biological treatment and chemical precipitation.
Incoming amounts after bio-treatment: 220 mg COD/l; 60 mg SS/l.

The flow to (15) and SS (16) in the incoming water are measured as well as COD (17) and SS (17) in the outgoing purified/treated water. The signal from the flow measuring instrument regulates the screw (3) for dosage of aluminium sulphate (powder/granules), which is stored in a silo (1), so that a flow proportional dosage occurs within the interval 30-40 g Al/m$^3$. This means that the dosage of aluminium, at a flow of 3,000 m$^3$/h. is at most about 120 kg/h. In the dissolution tank (9) aluminium sulphate is dissolved in water during stirring. The supply of water (5) is constant so that the Al-concentration does not exceed about 4%, i.e., the water supply is about 3 m$^3$/h measured by the flow meter (7). The aluminium sulphate solution is lead with down ward slope to the reaction tank (11). Where within the interval 30-40 g Al/m$^3$ the dosage should is controlled by an on-line sensor (17) which measures COD on the (outgoing clear phase of water) supernatant. If the amount of COD increases and approaches 100 mg/l the Al-dosage is increased and if the amount is reduced occurs a decrease of the dosage so that an average COD of 95 mg/l is maintained at the same time the limit of 100 mg/l is not exceeded. Magnesium hydroxide is stored in a silo (2) and is dosed with a dosage screw (4) to a slurry preparation tank (10) equipped with a mixer. The basicity is regulated from 0-50%, i.e., the maximal magnesium hydroxide dosage is calculated after a basicity of 50% and an aluminium amount of 120 kg/h. This gives a maximal magnesium hydroxide consumption of about 200 kg/h. The maximal magnesium hydroxide concentration in the slurry tank shall be about 30% and the water supply (6) is calculated on that. Supply of water to the slurry tank, which is measured with a flow meter (8) will be constant and about 500 l/h. The slurry is transported from the preparation tank to the reaction tank (11) with down ward slope. The total amount of fluid, i.e., aluminium sulphate solution and magnesium hydroxide slurry to the reaction tank is thus more or less constant and 3.5 m³/h. Within the reaction tank the solution is mixed and the slurry allowed to react by the aid of a mixer. The theoretical reaction time within the tank which is divided into a number of boxes is about 1 h. This means that the reaction tanks total volume is about 3.5 m³. The mixture which from start is milk coloured will upon the polymerisation occurs become clear (if there are traces of impurities, such as lime or iron, this could result in that the solution still is turbid. From the reaction tank is the coagulant transported with down ward slope to the precipitation plants intensive mixing tank (18) where the coagulant is mixed with the incoming sewage water (13). In this tank micro flocculants are formed. These are formed and enlarged in the following flocculation tank (19). The flocculated water leads to the sedimentation tank (21) where the flocks are separated and a bottom sludge is produced (20). At the same time (a clear water phase) the supernatant is transferred from the sedimentation surface (14) to the recipient. The degree of SS is measured by an on-line sensor (17) in the outgoing purified water (supernatant) as well as on the incoming water (16). The measured degree of SS regulates the dosage of magnesium hydroxide, i.e., the basicity within the given interval 0-50%. Thus the basicity is increased if the degree of SS is increased in the incoming water and vice verse. The change of the basicity occurs by the aid of experience stored data. If this does not result in the expected a correction will occur of the basicity with the aid of the SS measurements in the supernatant. The expected effect is supposed to be understood to be that the degree of SS in the supernatant should be in average 20 mg/l but never exceed 25 mg/l. The reason to measure on the incoming water is due to be able to compensate for the delay in time that occurs upon coagulation and sedimentation before the degree of SS (and COD) can be measured in the clear water phase (supernatant). The polymerisation takes about one hour prior to that the changes of the dosage of the magnesium hydroxide could be detected and the complete effect obtained.

The invention claimed is:

1. A method for chemical precipitation purification in a water treatment plant or waste water treatment plant, the method comprising:

continuously obtaining on-line measurements of a contamination degree of incoming untreated water and/or outgoing treated water;

continuously providing a coagulant solution comprising an aluminum-based coagulant having a basicity to a reaction vessel;

continuously regulating the basicity of the aluminum-based coagulant in situ by reacting a controlled amount of hydroxide ions with the aluminum-based coagulant in the reaction vessel to form a hydroxylated aluminum coagulant solution, wherein in situ regulation of the basicity is based on the contamination degree measurements; and continuously adding a dosage of the hydroxylated coagulant solution from the reaction vessel to untreated water in a treatment tank to form flocculated water, wherein:

the hydroxide ions are provided from a suspension of magnesium hydroxide or calcium hydroxide, the aluminum-based coagulant is monomeric aluminum sulphate, the water treatment plant purifies raw water, and the waste water treatment plant purifies waste water, the untreated water is raw water or waste water, the waste water is municipal waste water or industrial process waste water, the waste water comprises soluble and insoluble organic and inorganic substances, and the measurements of the contamination degree are performed by analyzing one or more selected from the group consisting of turbidity, color, COD, TOC and phosphate within the incoming water and/or after chemical precipitation and separation of flocks formed by the coagulant.

2. A method according to claim 1, wherein the regulation is dependent on the temperature of the flocculated water.

3. A method according to claim 1, wherein the pH of the flocculated water is kept between about 5.5 to about 6.5.

4. A method according to claim 1, wherein the on-line measurements of the contamination degree of incoming untreated water and/or outgoing treated water obtained are stored as data in a database, and the regulation of the basicity of the aluminum-based coagulant in situ is based on the stored data.

5. A method according to claim 1, wherein the waste water is waste water from pulp and paper mills.

6. A method according to claim 5, wherein the waste water contains rests of lignin.

7. A method according to claim 1, wherein the raw water is raw water from a river.

8. A method according to claim 7, wherein the raw water contains humus substance.

9. A method according to claim 1, wherein the untreated water is continuously mixed with the hydroxylated coagulant solution in the treatment tank to form flocculated water which is thereafter transported to a flocculation tank provided with a slow-moving flocculation mixer.

* * * * *